US008053257B2

(12) United States Patent
Chanda et al.

(10) Patent No.: US 8,053,257 B2
(45) Date of Patent: Nov. 8, 2011

(54) METHOD FOR PREDICTION OF PREMATURE DIELECTRIC BREAKDOWN IN A SEMICONDUCTOR

(75) Inventors: Kaushik Chanda, Fishkill, NY (US); Hazara S. Rathore, Stormville, NY (US); Paul S. McLaughlin, Poughkeepsie, NY (US); Robert D. Edwards, Marlboro, NY (US); Lawrence A. Clevenger, LaGrangeville, NY (US); Andrew P. Cowley, Wappingers Falls, NY (US); Chih-Chao Yang, Glenmont, NY (US); Conrad A. Barile, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 12/061,104

(22) Filed: Apr. 2, 2008

(65) Prior Publication Data
US 2008/0174334 A1 Jul. 24, 2008

Related U.S. Application Data

(63) Continuation-in-part of application No. 11/160,213, filed on Jun. 14, 2005, now abandoned.

(51) Int. Cl.
*H01L 21/00* (2006.01)
(52) U.S. Cl. .................................. 438/17; 257/E21.521
(58) Field of Classification Search ............ 438/17; 257/E21.521
See application file for complete search history.

(56) References Cited

U.S. PATENT DOCUMENTS

| | | | |
|---|---|---|---|
| 4,904,946 A | 2/1990 | Hirai | |
| 5,202,640 A | 4/1993 | Schaaf et al. | |
| 5,420,513 A * | 5/1995 | Kimura | 324/551 |
| 5,822,717 A * | 10/1998 | Tsiang et al. | 702/108 |
| 6,014,034 A | 1/2000 | Arora et al. | |
| 6,014,734 A | 1/2000 | Tran et al. | |
| 6,043,662 A | 3/2000 | Alers et al. | |
| 6,047,243 A | 4/2000 | Bang et al. | |
| 6,351,135 B1 | 2/2002 | Kim | |
| 6,465,266 B1 | 10/2002 | Yassine et al. | |
| 6,489,783 B1 | 12/2002 | Liu et al. | |
| 6,583,641 B2 | 6/2003 | Wang et al. | |
| 6,602,729 B2 | 8/2003 | Lin | |
| 6,781,401 B2 | 8/2004 | Kim | |
| 6,996,447 B2 * | 2/2006 | Onishi et al. | 700/108 |
| 7,106,087 B2 * | 9/2006 | Okada | 324/754.03 |
| 2002/0033710 A1 | 3/2002 | Kim | |
| 2004/0027149 A1 * | 2/2004 | Aitren et al. | 324/765 |
| 2006/0115910 A1 * | 6/2006 | Okada | 438/17 |

OTHER PUBLICATIONS

Dielectric Breakdown Identification For VLSI R.A. Carballo and G.D. O'Rourke vol. 24 No. 10—Mar. 1982 Non Patent Literature—IBM TDB 03-82—p. 5169.

* cited by examiner

*Primary Examiner* — William D Coleman
(74) *Attorney, Agent, or Firm* — Lisa U. Jaklitsch; Katherine S. Brown

(57) ABSTRACT

The invention predicts premature dielectric breakdown in a semiconductor. At least one dielectric breakdown mode is calculated for a layer within chips comprising a semiconductor wafer lot. If only one mode is calculated, that is the best calculated mode. If multiple modes can be calculated, a best mode that most accurately represents dielectric breakdown for the semiconductor wafer lot is determined. Premature dielectric breakdown will be associated with any semiconductor with a breakdown voltage less than a predetermined standard deviation from the best calculated mode.

11 Claims, 9 Drawing Sheets

US 8,053,257 B2

METHOD FOR PREDICTION OF PREMATURE DIELECTRIC BREAKDOWN IN A SEMICONDUCTOR

RELATED APPLICATIONS

This application is a continuation in part application of co-pending U.S. patent application Ser. No. 11/160,213, entitled "METHOD FOR PREDICTION OF PREMATURE DIELECTRIC BREAKDOWN IN A SEMICONDUCTOR" filed on Jun. 14, 2005.

BACKGROUND OF THE INVENTION

1. Field of the Invention

The invention relates generally to semiconductors and more particularly to predicting premature dielectric breakdown for semiconductors on a semiconductor wafer.

2. Description of the Related Art

Dielectric breakdown is important because dielectric breakdown provides an accurate measure of the Back End of the Line ("BEOL") reliability of a semiconductor. Semiconductor defects cause dielectric breakdown. Therefore, when one monitors dielectric breakdown, one monitors the health of the manufacturing line.

One prior art method for determining dielectric breakdown is time dependent dielectric breakdown ("TDDB") test, which stresses a semiconductor at a constant voltage, e.g. 12 V, over an extended period of time, e.g. 1000 hours. A serpentine comb structure, such as shown in FIG. 1, is applied to an area $3 \times 10^6$ um$^2$ large on the semiconductor and detects any leakage current between a pair of metal lines in the semiconductor. TDDB test is not a wafer level test. Therefore the wafer must be diced and the selected chips must be packaged into modules. Accordingly, TDDB test is expensive because of the associated dicing and packaging costs, e.g. operation of the ovens. In addition, TDDB test is inefficient because the test period extends for over a month. Finally, TDDB test wastes resources because both the wafer and the tested semiconductors are destroyed. For at least these reasons, TDDB test is problematic.

Another prior art method for determining dielectric breakdown is a current voltage ("IV") test, which stresses a semiconductor at a ramped voltage, e.g. 0-100 V with a step size of 1 V, for an abbreviated period of time, e.g. 100 seconds. Similar to TDDB test, a serpentine-comb test structure is used to monitor for leakage current, however unlike TDDB test, IV test is implemented at the wafer level, accordingly the wafer must not be diced and semiconductors must not be packaged. IV test is inefficient to conduct on every chip because IV test requires the tedious study of IV plots such as shown in FIG. 2 for abrupt increases 205 or decreases 210 in leakage current. Dielectric breakdown occurs whenever the IV plot indicates an abrupt discontinuity in leakage current. Weak dielectric breakdown is apparent whenever a chip experiences dielectric breakdown at a voltage statistically lower than other chips in the same lot of wafers. Therefore, with continued reference to FIG. 2, the chip that has an abrupt discontinuity in leakage current 205 is unreliable because the chip experiences weak dielectric breakdown at 25 V, while other chips in the same lot of wafers experience dielectric breakdown between 35 and 50 V.

What is needed in the art is an improved method for the determination of dielectric breakdown, which is inexpensive and efficient, can be applied to a large number of chips, and avoids destruction of the semiconductor wafer.

BRIEF SUMMARY OF THE INVENTION

The invention predicts BEOL reliability efficiently and without destruction of the semiconductor wafer. Therefore, the invention predicts BEOL reliability quickly, while at the same time salvaging the semiconductor wafer. Further, the invention predicts BEOL reliability through the use of pre-existing comb-serpentine structures on the manufacturing line. Accordingly, the invention predicts BEOL reliability without costly modifications to existing manufacturing processes. Finally, the invention is implemented in real time. Accordingly, the invention reduces man hours and avails machines previously reserved for TDDB testing.

For at least the foregoing reasons, the invention improves upon premature dielectric breakdown prediction for semiconductors.

BRIEF DESCRIPTION OF THE INVENTION

The features and the element characteristics of the invention are set forth with particularity in the appended claims. The figures are for illustrative purposes only and are not drawn to scale. Furthermore, like numbers represent like features in the drawings. The invention itself, however, both as to organization and method of operation, may best be understood by reference to the detailed description which follows, taken in conjunction with the accompanying figures, in which:

DETAILED DESCRIPTION OF THE INVENTION

The invention will now be described with reference to the accompanying figures. In the figures, various aspects of the structures have been shown and schematically represented in a simplified manner to more clearly describe and illustrate the invention.

By way of overview and introduction, the invention comprises an improved method for efficiently predicting dielectric breakdown in the BEOL ("Back End of the Line") that occurs in real time with minimal implementation cost and without destruction of the semiconductor wafer. The invention has application with respect to any dielectric material typically used to insulate interconnects in the BEOL, including but not limited to, $SiO_2$, FTEOS, FSG, USG, SiCOH, p-SiCOH, as well as organic spin-on dielectrics such as SiLK, MSQ. Defects in semiconductors cause premature dielectric breakdown. Accordingly, by predicting premature dielectric breakdown in real time, the invention accomplishes an accurate assessment of the health of the manufacturing line at any given moment in time.

Figure 4:
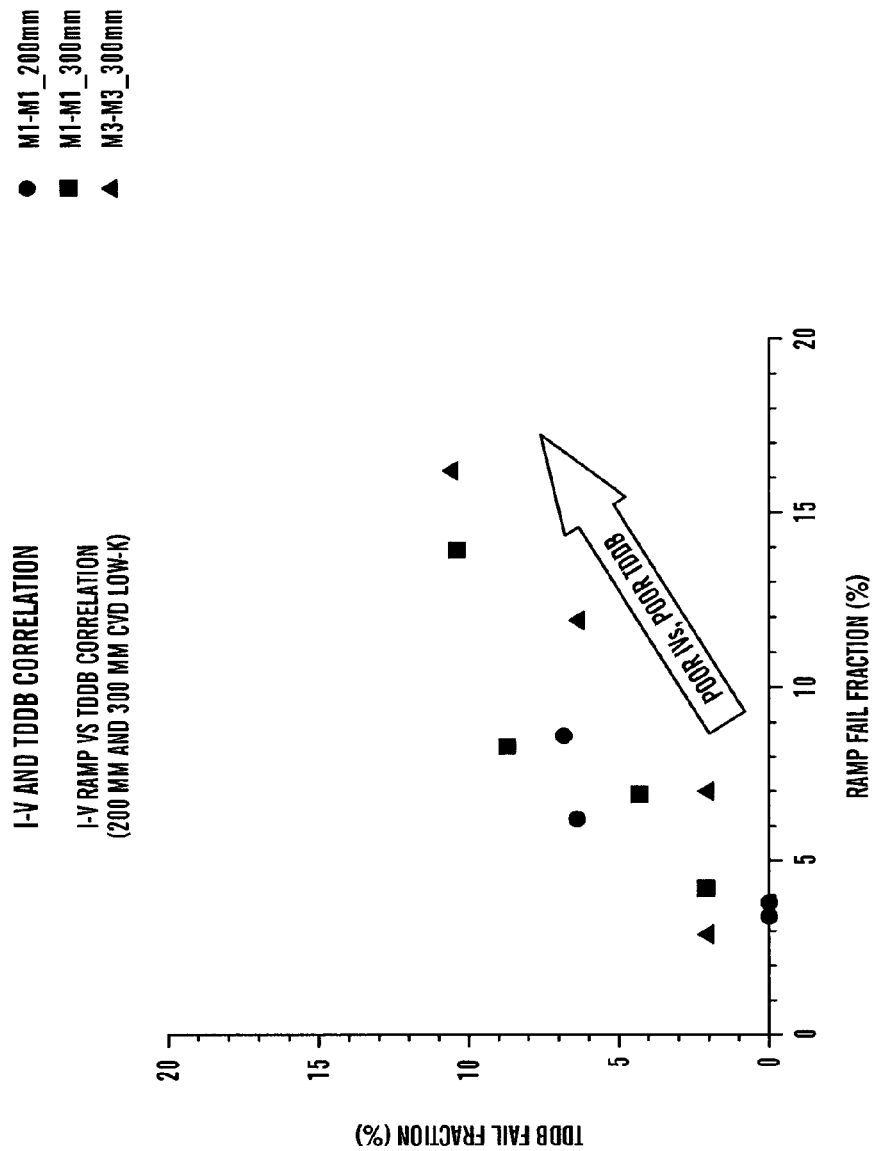
FIG. 4 depicts results of dielectric breakdown prediction determined in accordance with the prior art versus predicted in accordance with the preferred embodiment of the invention.

The preferred embodiment of the invention calculates at least one dielectric breakdown mode for a semiconductor wafer, more specifically, for a particular layer within chips that comprise a lot of such wafers. The mode comprises a cumulative dielectric breakdown distribution and breakdown voltage for each of a representative population of semiconductors of such lot. The cumulative dielectric breakdown distribution indicates the percentage of semiconductors in a representative population of semiconductors with dielectric breakdown by a particular voltage. The cumulative dielectric breakdown distribution may indicate, for example, that 80% of the semiconductors demonstrate dielectric breakdown by 70V, while only 1% demonstrate dielectric breakdown by 11V. Further the cumulative dielectric breakdown distribution may indicate a single calculated mode or two calculated modes, i.e. a unimodal distribution or bimodal distribution of dielectric breakdown for such lot. Based upon the calculated modes in the cumulative distribution, the invention can predict premature dielectric breakdown (as shown in FIG. 4). More specifically, in response to a single calculated mode, the invention associates premature dielectric breakdown with any semiconductor with a breakdown voltage less than a predetermined standard deviation of a plurality of breakdown voltages from the calculated mode. In response to multiple calculated modes, the invention determines the best calculated mode (that most accurately represents dielectric breakdown) and associates premature dielectric breakdown with any semiconductor with a breakdown voltage less than a predetermined standard deviation from that best calculated mode.

Figure 1:
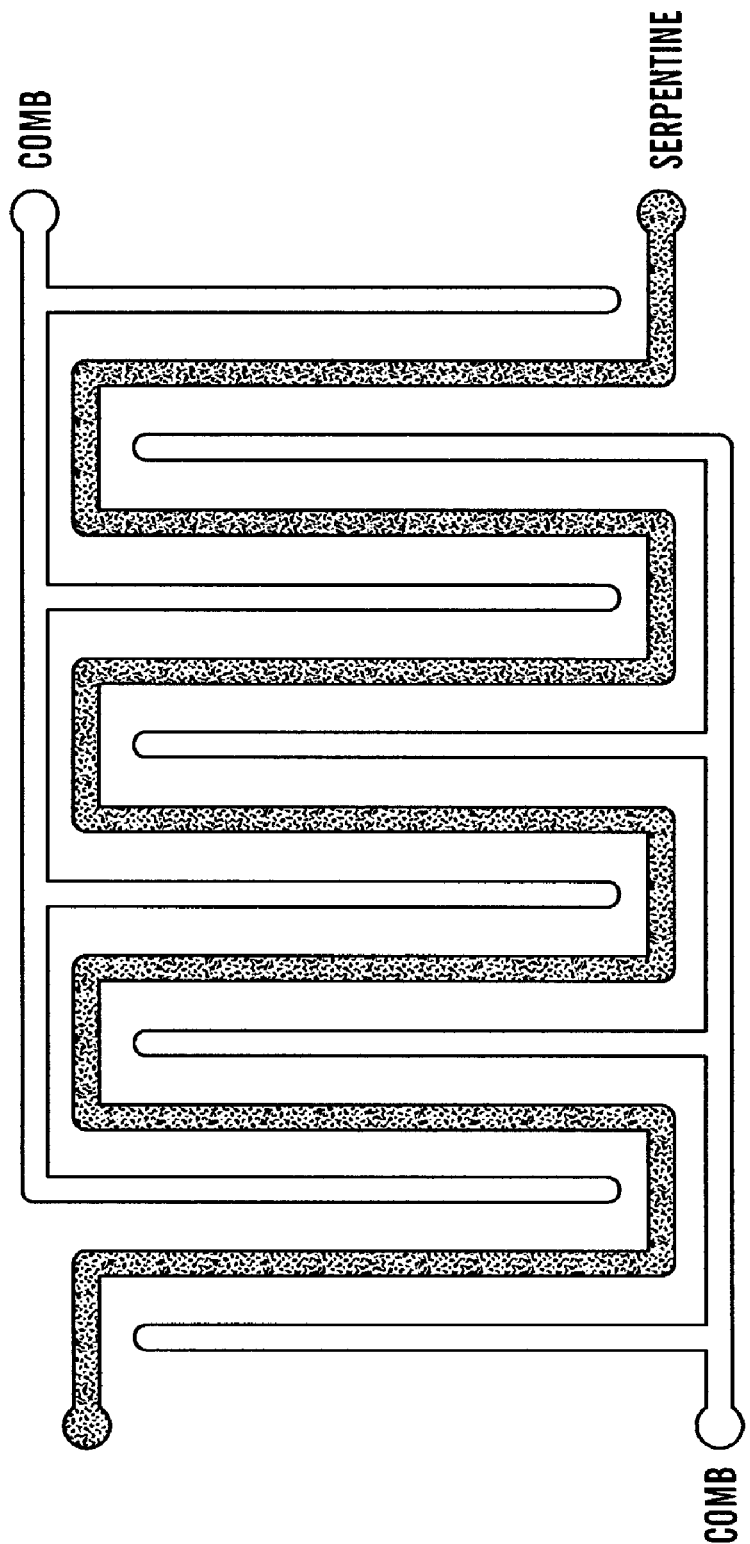
FIG. 1 depicts a prior art serpentine comb test structure.
Figure 2:
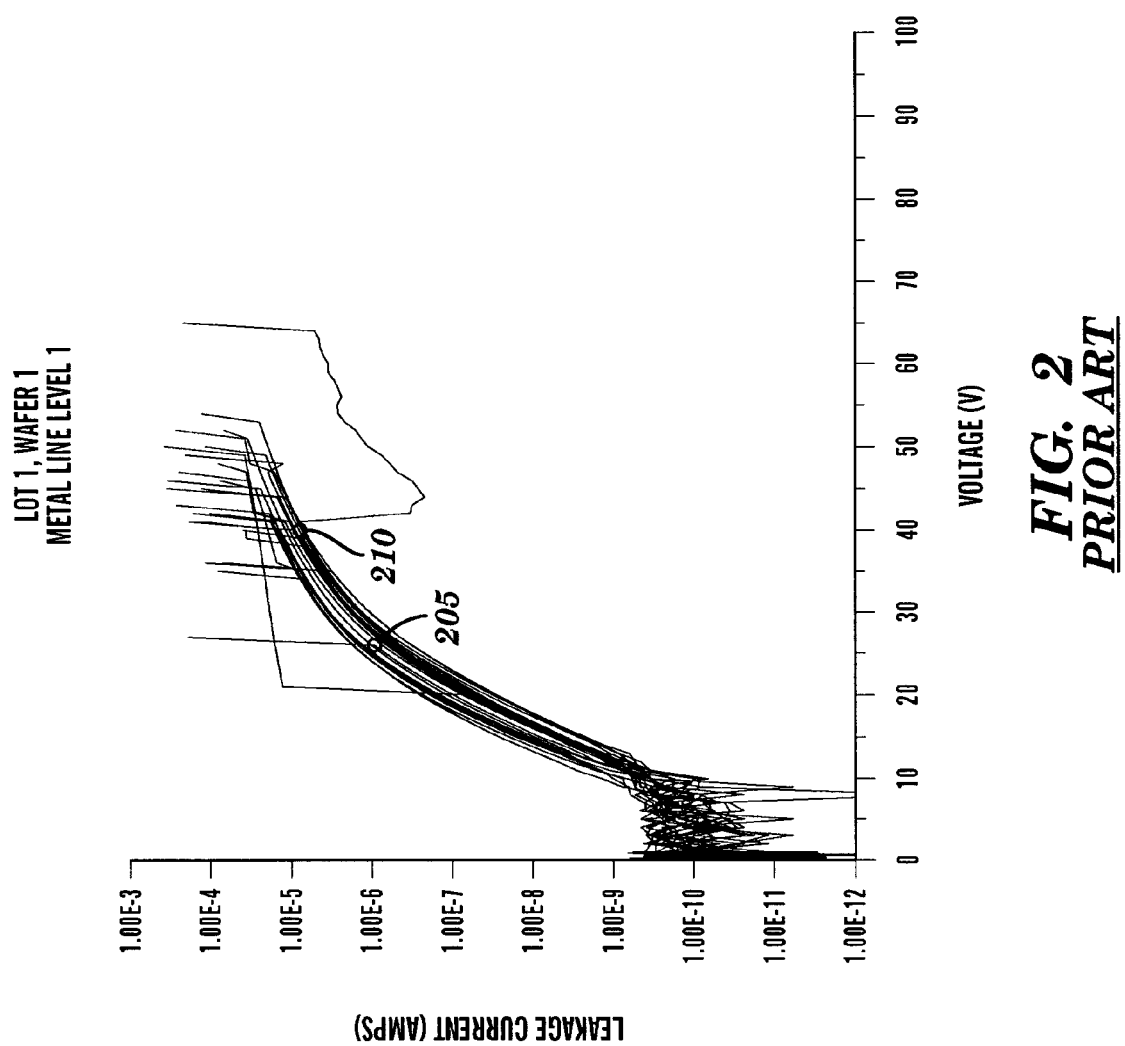
FIG. 2 depicts the results of a prior art IV test.
Figure 3A:
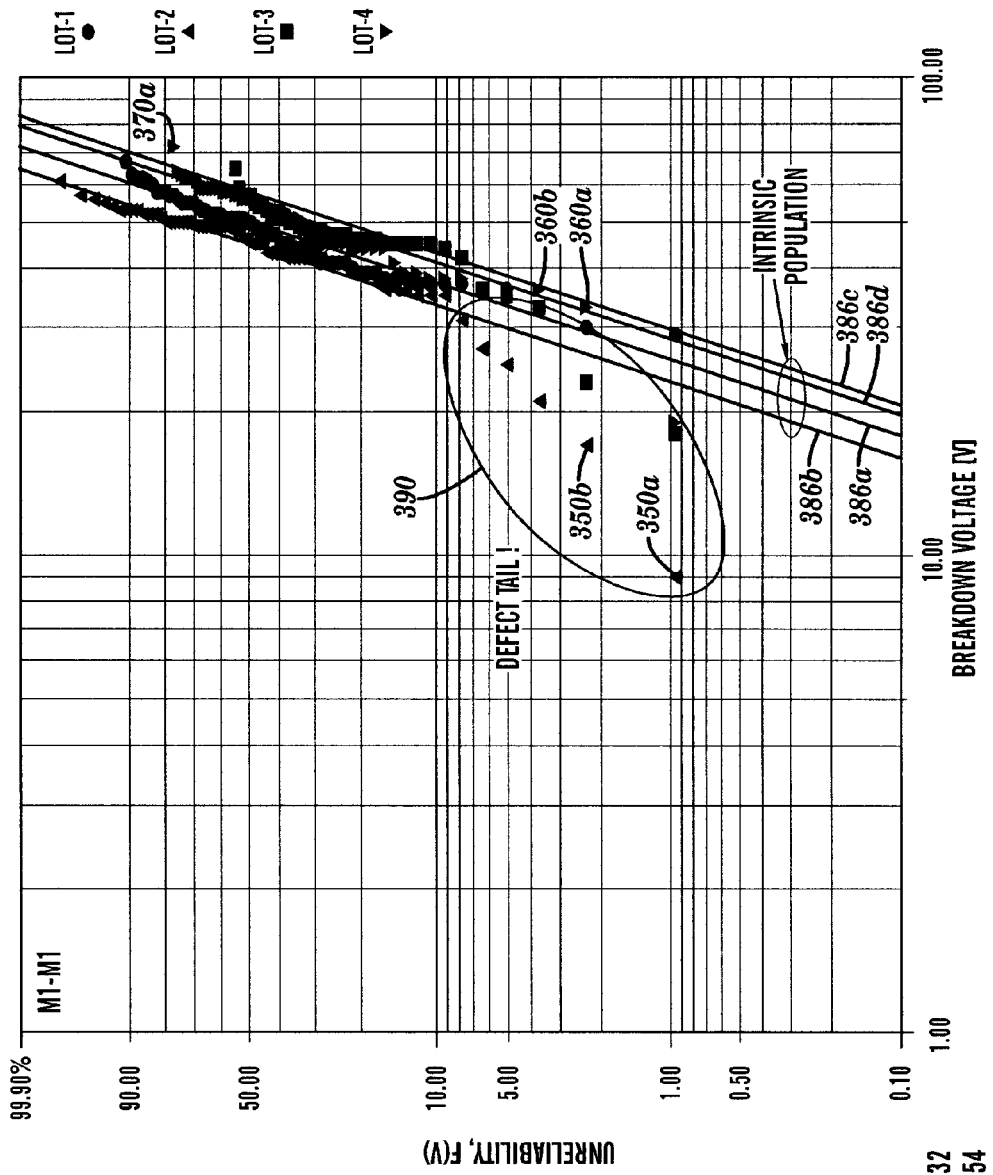
FIGS. 3a-3d depicts calculated modes in a cumulative dielectric breakdown distribution in accordance with a preferred embodiment of the invention.
Figure 3B:
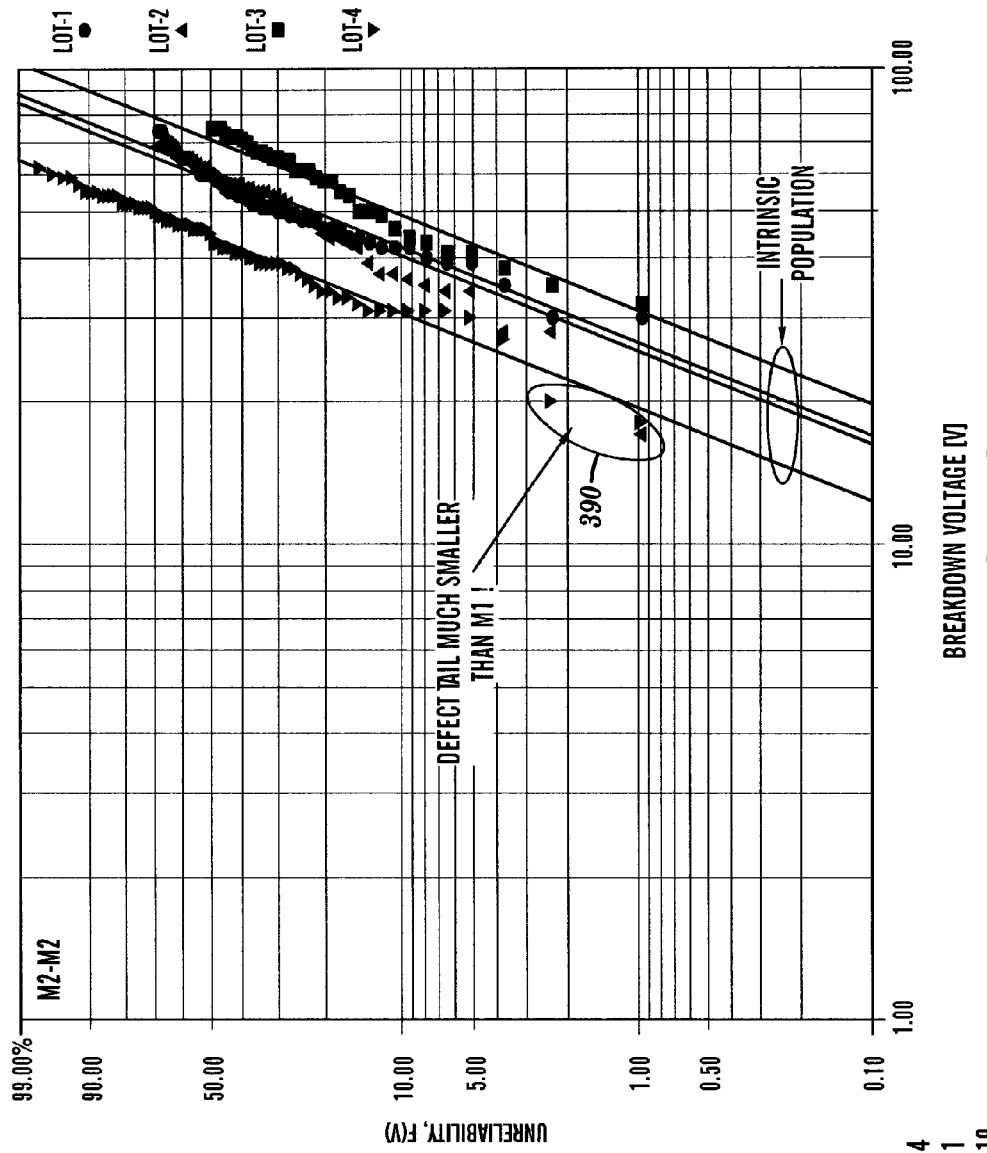
Figure 3C:
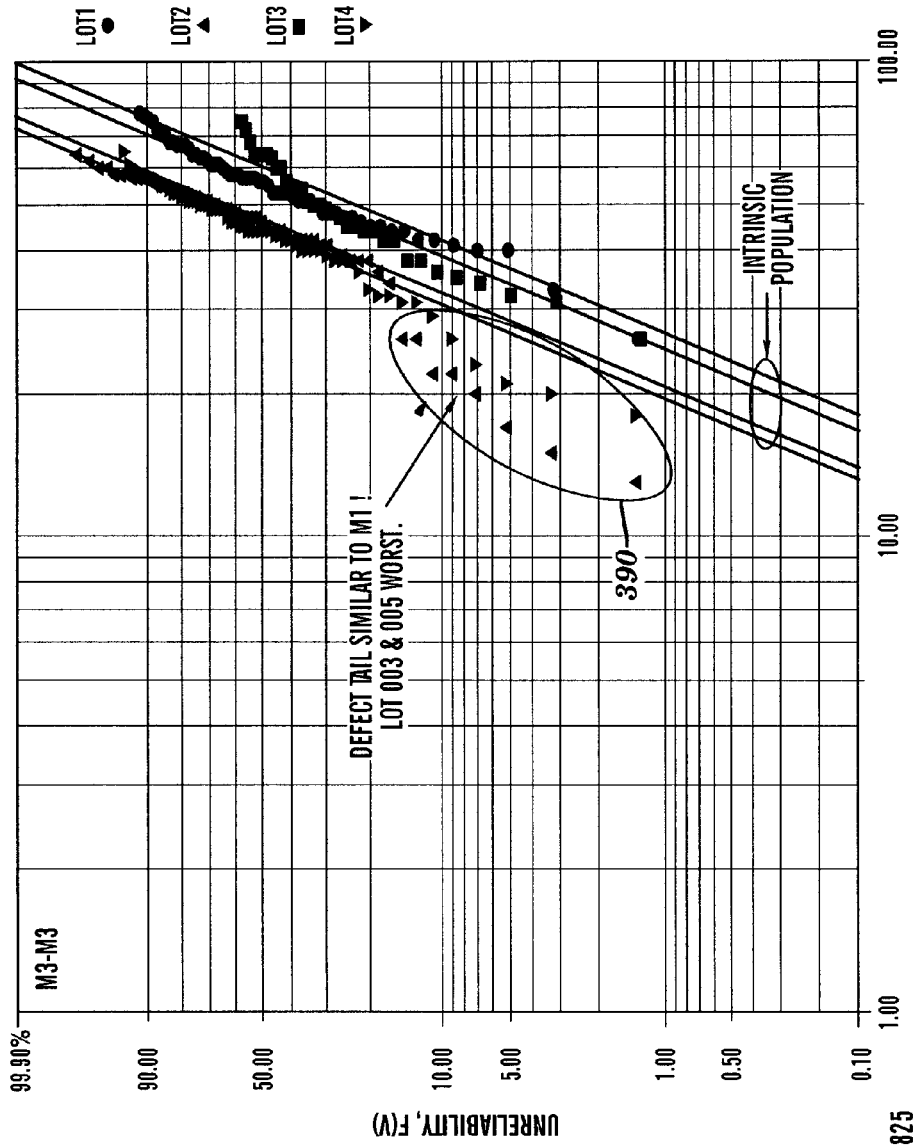

FIGS. 3a-3c depict calculated modes in accordance with an embodiment of the invention. FIGS. 3a-3c depict the cumulative dielectric breakdown distribution on the y axis and the breakdown voltage on the x axis of a Weibull graph. The cumulative dielectric breakdown, Cdf, is determined according to the following formula:

$$F(V)=100*(i-0.3)/(n+0.4))$$

n=total sample size
i=rank of failure

For the purpose of explanation, if there are five samples and the dielectric breakdown voltages in ascending order were 10, 20, 25, 30, and 34, then the V, F(V) table would be:

| i | F(V) | V |
|---|---|---|
| 1 | 100*0.7/5.4 = 12.96% | 10 |
| 2 | 100*1.7/5.4 = 31.48% | 20 |
| 3 | 100*2.7/5.4 = 50.0% | 25 |
| 4 | 100*3.7/5.4 = 68.52% | 30 |
| 5 | 100*4.7/5.4 = 87.04% | 34 |

The results are then plotted on Weibull paper. The Weibull equation is as follows:

$$F(V)=1-\text{Exp}\{-(V/\eta)^\beta\}$$

As described herein below, $\eta$ represents the voltage by which 63.2% of the samples would fail, and $\beta$ represents the slope of the calculated mode.

The solid lines 386a-386d represent the calculated mode that most accurately represents dielectric breakdown, i.e., the best fit of an F(V): V data set to the Weibull equation, for four lots of wafers. The defect tail 390 represents a second calculated mode. Accordingly, lots with a defect tail 390 demonstrate a bimodal dielectric breakdown distribution. Any semiconductor with a data point within a predetermined standard deviation of a best calculated mode (that most accurately represents dielectric breakdown) is within that lot's intrinsic population. The Weibull statistics of $\beta$ and $\eta$ are depicted for four lots of wafers. $\beta$ represents the slope of the calculated mode, while $\eta$ represents the breakdown voltage by which 63.2 percent of the population will experience dielectric breakdown for each of the four lots. The steeper the slope, $\beta$, the less deviation in breakdown voltages for a given lot. In FIGS. 3a-3c, the dielectric breakdown test results are depicted for a given metal line of semiconductors in four lots of wafers. A representative population of semiconductors, for example twenty four semiconductors, are tested in line and at the wafer level. The representative population of semiconductors is represented by circles, triangles, squares, and inverted triangles for lot 1, lot 2, lot 3, and lot 4, respectively. Dielectric breakdown voltage for each semiconductor of the representative population is plotted against the cumulative dielectric breakdown distribution for the lot. As mentioned herein above, FIGS. 3a-3c depict the calculated mode that most accurately represents dielectric breakdown, i.e., the best calculated mode, 386 for four lots of wafers, as well as other calculated modes, such as the defect tail 390. Therefore, semiconductors with a breakdown voltage less than a predetermined standard deviation from the best calculated mode can be associated (as shown in FIG. 4) with premature dielectric breakdown, while semiconductors with a breakdown voltage within the predetermined standard deviation or greater than the predetermined standard deviation from the best calculated mode are associated with average and superior dielectric breakdown, respectively. Semiconductors with a breakdown voltage less than a predetermined standard deviation from the best calculated mode are found in the defect tail 390 of FIGS. 3a-3c.

With continued reference to FIG. 3a, FIG. 3a represents the Weibull graph for metal line 1 of semiconductors for lots one through four. The semiconductor represented by the triangular data point 350a, which is a lot 2 semiconductor, had a cumulative dielectric breakdown distribution of 0.9% and a breakdown voltage of 9V. In other words, only 0.9% of the semiconductors in the lot experienced dielectric breakdown by 9V. Because dielectric breakdown occurred with a breakdown voltage less than a predetermined standard deviation from the best calculated mode for lot 2, 386b, premature dielectric breakdown can be associated with the semiconductor represented by data point 350a. For the same reasons, premature dielectric breakdown can be associated with semiconductor represented by data point 350b and all other semiconductors in the defect tail 390. Such semiconductors have weak BEOL reliability.

Inverted triangular data points 360a and 360b in FIG. 3a represent semiconductors tested in lot four, which had a cumulative dielectric breakdown between 2 and 4% at a breakdown voltage between 30-40 V. In other words, between 2 and 4% of the semiconductors in lot four experienced dielectric breakdown by between 30-40 V. Those semiconductors represented by 360a or 360b are not associated with premature dielectric breakdown because the dielectric breakdown occurred within a predetermined standard deviation for the best calculated mode for the semiconductor wafers in lot 4, 386d. Instead, average dielectric breakdown is associated with the semiconductors represented by data points 360a and 360b.

Inverted triangular data point 370a in FIG. 3a represents a semiconductor tested in lot four. Point 370a had a cumulative dielectric breakdown between 70 and 80% at a breakdown voltage of 70V. In other words, by 70V between 70 and 80% of the semiconductors in lot four experienced dielectric breakdown. Those semiconductors represented by 370a are not associated with premature dielectric breakdown because the dielectric breakdown occurred at a breakdown voltage greater than a predetermined standard deviation from the best calculated mode for lot 4, 386d. Instead, superior dielectric breakdown is associated with the semiconductor represented by data point 370a.

FIGS. 3b and 3c depict metal lines two and three, respectively, for each of the four lots of wafers. Once again, the semiconductors represented by the data points within the defect tail 390 can be associated with premature dielectric breakdown. Therefore, such semiconductors represented by data points within defect tail 390 have weak BEOL reliability. As shown in FIG. 3b, the BEOL reliability improved for metal line two because fewer semiconductors have a breakdown voltage less than the predetermined standard deviation and within the defect tail 390. However, as shown in FIG. 3c, the BEOL reliability worsened for metal line 3 because more semiconductors were represented by data points within the defect tail 390. FIGS. 3a-3c demonstrate that BEOL reliability for a given semiconductor can differ by metal line level.

Figure 3D:
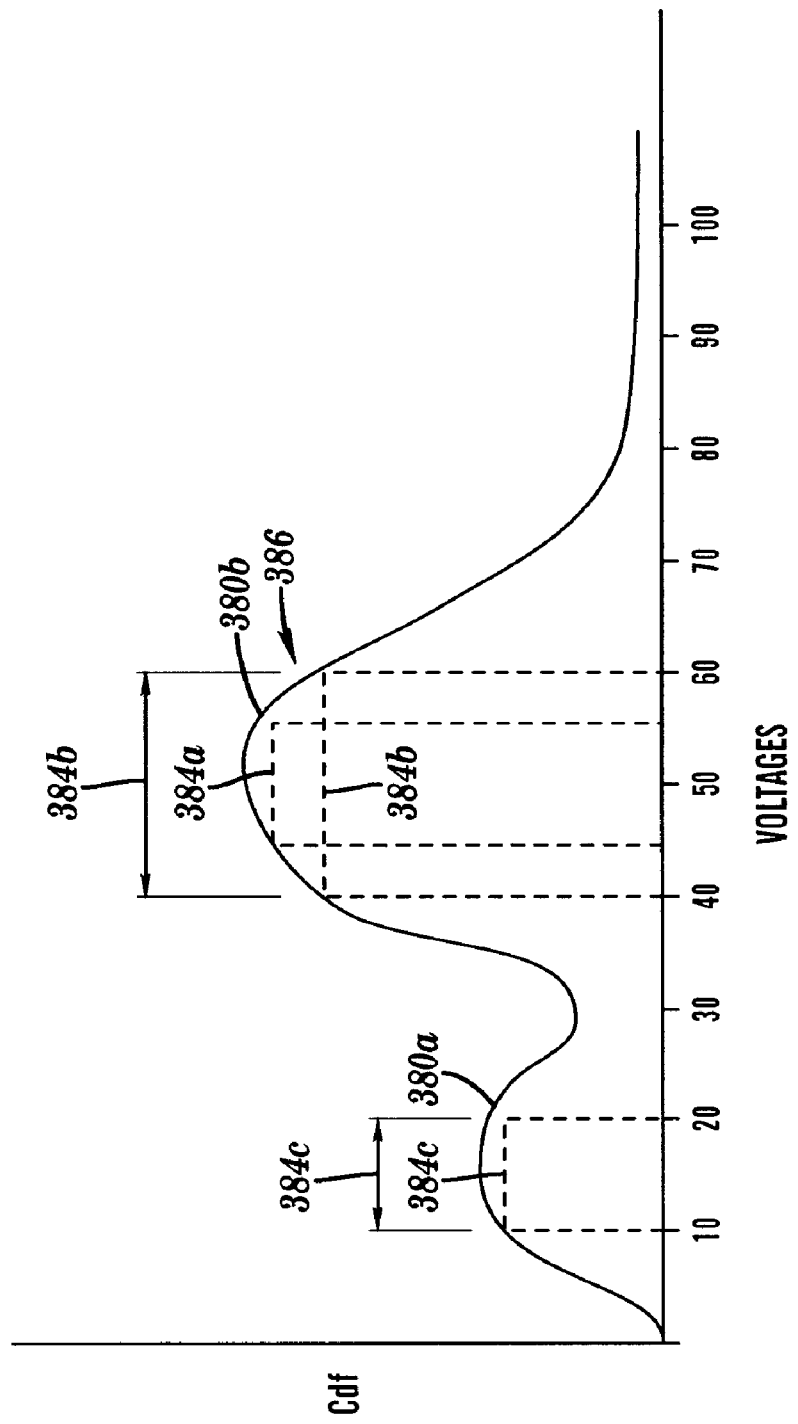

FIG. 3d depicts the cumulative distribution function ("cdf") of semiconductors from lot 2 from FIG. 3a. Two calculated modes 380a,b are shown in FIG. 3d, i.e. FIG. 3d depicts a bimodal distribution. Two calculated modes 380 a,b are depicted because a number of semiconductors from lot 2 experienced dielectric breakdown between 10 and 20 volts, but the largest number of semiconductors from lot 2 experienced dielectric breakdown between 40 and 60 volts. Calculated mode 386 best represents dielectric breakdown for the wafer because the largest number of semiconductors from lot 2 experienced dielectric breakdown between 40 and 60 volts. At least one standard deviation 384 was calculated for both calculated modes. For best calculated mode 386, two standard deviations, 384a,b were calculated. In so doing, the preferred embodiment identifies weak dielectric breakdown with any semiconductor with a breakdown voltage less than a predetermined standard deviation of a plurality of breakdown voltages from said best calculated mode. As one of ordinary skill in the art would know, such predetermined standard deviation could be the first standard deviation 384a, the first through second standard deviation 384a,b respectively, or any other predetermined standard deviation that would isolate semiconductors with weak dielectric breakdown from the semiconductors with average and superior dielectric breakdown.

With continued reference to FIG. 3a and FIG. 3d, the lot 2 semiconductors in the defect tail 390 in FIG. 3a represents semiconductors in calculated mode 380a. Most of the lot 2 semiconductors, which are represented by triangles in FIG. 3a, in the defect tail 390 experience dielectric breakdown between 10 and 30 volts. Similarly, the calculated mode 380a depicts that most of the semiconductors in calculated mode 380a experience dielectric breakdown between 10 and 30 volts.

FIG. 4 depicts premature dielectric breakdown determined in accordance with the TDDB prior art versus weak dielectric breakdown found by IV ramp in accordance with the invention. Data points representing semiconductors in the first metal line of a 200 mm wafer, the first metal line in a 300 mm wafer, and the third metal line in a 300 mm wafer are represented in FIG. 4. The y axis represents the prior art test results while the x axis represents the invention's test results. As shown, the prior art TDDB test results are directly proportional to the invention's IV test results. Accordingly, the invention can predict dielectric breakdown at least as accurately as the prior art TDDB test.

Figure 5:
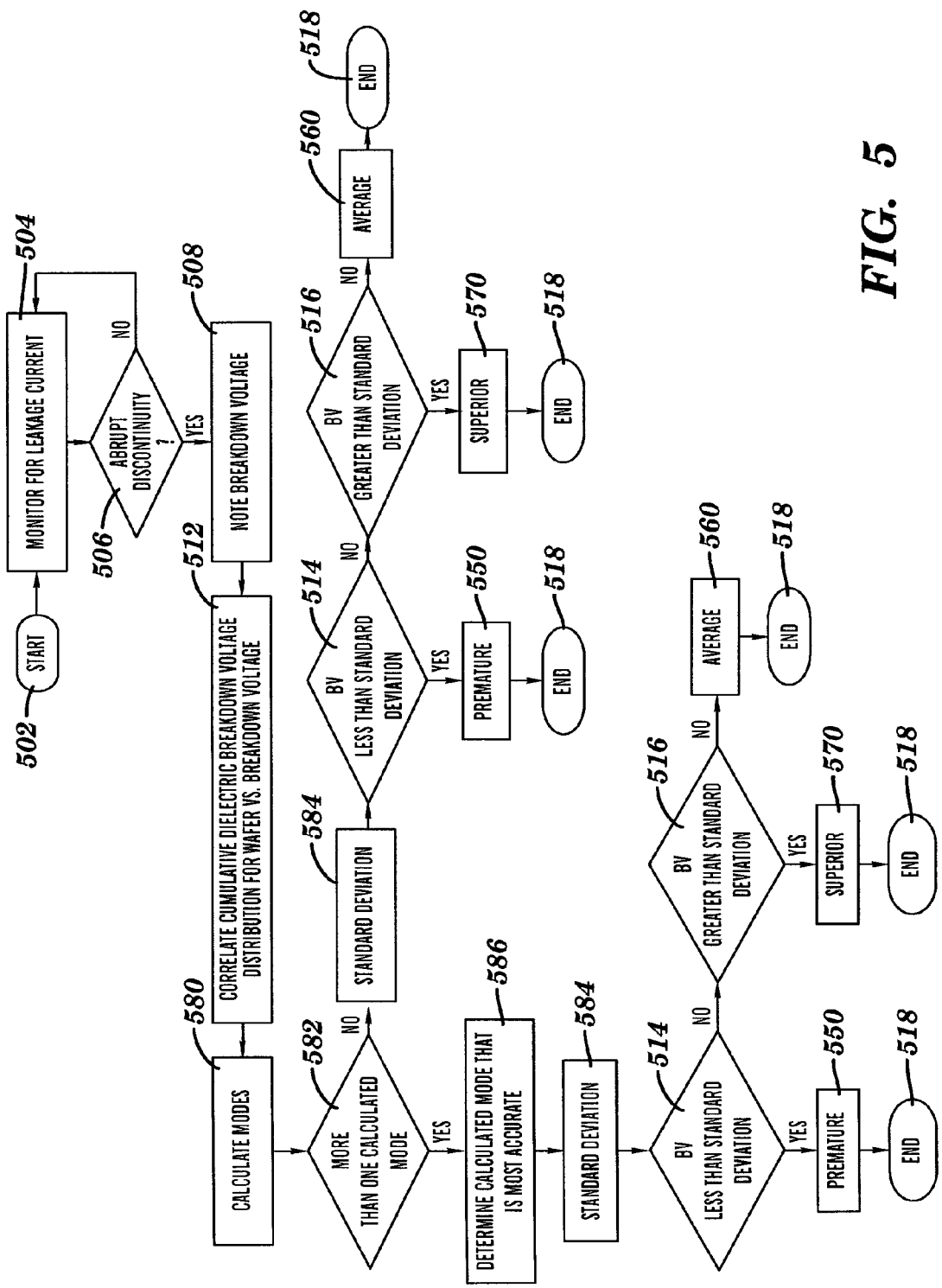
FIG. 5 depicts the method of the preferred embodiment of the invention.

FIG. 5 depicts the method of the preferred embodiment. In step 504, the invention monitors for leakage current. In step 506, abrupt discontinuities in leakage current are noted. In step 508, breakdown voltage is noted for the semiconductor at the abrupt discontinuity. Notation of breakdown voltage is in accordance with the preferred embodiment of the invention, but is just one indication of dielectric breakdown. Instead of breakdown voltage, a breakdown current could be noted in step 508 in accordance with an alternative embodiment of the invention. Once breakdown voltage is noted in step 508, in step 512 cumulative dielectric breakdown distribution is correlated with breakdown voltage for the semiconductor. In step 580, at least one mode is calculated. In step 582, it is determined if more than one calculated mode exists. If so, the best calculated mode is determined in step 586. Otherwise, the single calculated mode becomes the best calculated mode. A predetermined standard deviation is determined for the best calculated mode in step 584.

In FIG. 5, once a predetermined standard deviation for the best calculated mode is determined in step 584, the breakdown voltage for the semiconductors in the representative population is compared. If the breakdown voltage is less than the standard deviation from the best calculated mode in step 514, premature dielectric breakdown is associated with that semiconductor in step 550. Otherwise, the preferred embodiment queries if the breakdown voltage is greater than the standard deviation from the best calculated mode in step 516. If so, superior dielectric breakdown is associated with the semiconductor in step 570. Otherwise, the preferred embodiment associates average dielectric breakdown with the semiconductor in step 560.

Figure 6:
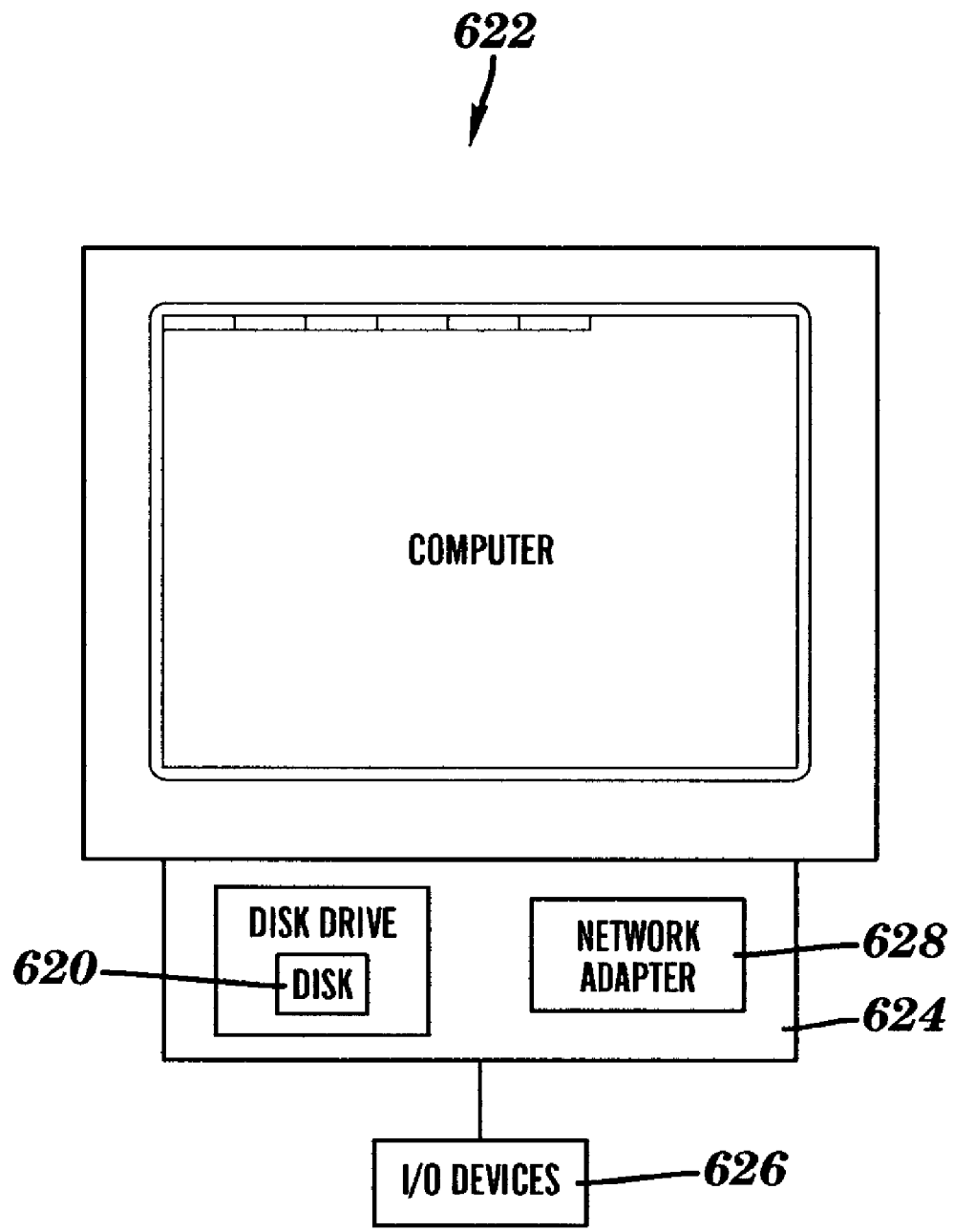
FIG. 6 depicts the program product of the preferred embodiment of the invention.

FIG. 6 depicts the program product of the preferred embodiment of the invention. The invention can take the form of an entirely hardware embodiment, an entirely software embodiment or an embodiment containing both hardware and software elements. In a preferred embodiment, the invention is implemented in software, which includes but is not limited to firmware, resident software, and microcode. Furthermore, the invention can take the form of a computer program product 620 accessible from a computer-usable or computer-readable medium providing program code for use by or in connection with a computer 622 or any instruction execution system. For the purposes of this description, a computer-usable or computer readable medium can be any apparatus that can contain, store, communicate, propagate, or transport the program for use by or in connection with the instruction execution system, apparatus, or device. The medium 620 can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system 624 suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices 626 (including but not limited to keyboards, displays, and pointing devices) can be coupled to the system either directly or through intervening I/O controllers. Network adapters 628 may also be coupled to the system to enable the data processing system to become coupled to other data processing systems or remote printers or storage devices through intervening private or public networks. Modems, cable modem and Ethernet cards are just a few of the currently available types of network adapters.

In sum, the invention predicts BEOL reliability efficiently, accurately, and without destruction of the semiconductor wafer. In addition, the invention simplifies BEOL reliability testing, such that BEOL reliability in accordance with the invention can be implemented on a large number of semiconductors. Finally, because the invention monitors for weak dielectric breakdown, an indication of a semiconductor defects, in real time, the invention enables an accurate assessment on the health of the manufacturing line at any given moment in time.

While the invention has been particularly described in conjunction with a specific preferred embodiment and other alternative embodiments, it is evident that numerous alternatives, modifications and variations will be apparent to those skilled in the art in light of the foregoing description. It is therefore intended that the appended claims embrace all such alternatives, modifications and variations as falling within the true scope and spirit of the invention.

What is claimed is:

1. A method for avoiding premature dielectric breakdown in a semiconductor, comprising, the steps of:
   identifying a premature TDDB failure fraction representing an acceptance criteria;
   selecting a target cumulative dielectric breakdown fraction corresponding to said premature TDDB failure fraction from a correlation of premature TDDB failure fraction and cumulative dielectric breakdown;
   identify the early failure fraction for a representative population of a lot of semiconductor wafers;
   discard said lot of semiconductor wafers if said early failure fraction exceeds said target cumulative dielectric breakdown fraction.

2. A method as in claim 1, wherein said representative population displays at least a best calculated mode and a weak breakdown mode, said best calculated mode being a best fit to the Weibull equation of cumulative dielectric breakdown function and breakdown voltage for each of said representative population and said weak breakdown mode being a best fit to the Weibull equation of a subset of said representative population with breakdown voltage less than a standard deviation from said best calculated mode, said method further comprising:
   identifying said early failure fraction as the cumulative dielectric breakdown at the intersection of said best calculated mode and said weak breakdown mode.

3. A method as in claim 2 further comprising, the step of:
   receiving a breakdown voltage for each of said representative population.

4. A method as in claim 2 further comprising, the step of:
   determining breakdown voltage for each of said representative population, which determining comprises the steps of:
   applying a plurality of increasing voltages to each of said representative population; and,
   monitoring leakage current between metal lines in said each for an abrupt discontinuity in leakage current;
   noting as the breakdown voltage for each of said representative population that voltage corresponding to said abrupt discontinuity.

5. A method as in claim 4, wherein said abrupt discontinuity comprises one of an abrupt increase and decrease in leakage current.

6. A method for avoiding premature dielectric breakdown in a semiconductor, comprising, the steps of:
   identifying a premature TDDB failure fraction representing an acceptance criteria;
   selecting a target cumulative dielectric breakdown fraction corresponding to said premature TDDB failure fraction from a correlation of premature TDDB failure fraction and an indication of premature dielectric breakdown;
   identify the early failure fraction for a representative population of a lot of semiconductor wafers;
   continue to process said lot of semiconductor wafers unless said early failure fraction exceeds said selected cumulative dielectric breakdown fraction.

7. A method as in claim 6, wherein a best calculated mode comprises a best fit to the Weibull equation of cumulative dielectric breakdown versus said indication of dielectric breakdown for each of said representative population.

8. A method as in claim 7,
   wherein said indication of dielectric breakdown is one of breakdown current and voltage for each of said representative population.

9. A method as in claim 8 further comprising, the step of:
   receiving said one of breakdown current and voltage for each semiconductor in said representative population.

10. A method as in claim 8 wherein said indication is breakdown current, the method further comprising, the step of:
    determining breakdown current for each semiconductor in said representative population of semiconductors, which determining comprises the steps of:
    applying a plurality of increasing currents to each semiconductor in said representative population; and,
    monitoring voltage for any abrupt discontinuity;
    noting as the breakdown current for said each semiconductor in said representative population that current corresponding to said abrupt discontinuity.

11. A method as in claim 9, wherein said abrupt discontinuity comprises one of an abrupt increase and decrease of said one of breakdown current and voltage.

\* \* \* \* \*